United States Patent
Hwang et al.

(10) Patent No.: US 10,644,330 B2
(45) Date of Patent: May 5, 2020

(54) BIPOLAR PLATE STRUCTURE HAVING OPTIMIZED GAS FLOW CHANNELS

(71) Applicant: Jenn-Jiang Hwang, Tainan (TW)

(72) Inventors: Jenn-Jiang Hwang, Tainan (TW);
Wei-Hong Weng, Tainan (TW);
Sung-En Wang, Tainan (TW);
Chih-Hong Lin, Tainan (TW)

(73) Assignee: Jenn-Jiang Hwang, Tainan (TW)

( * ) Notice: Subject to any disclaimer, the term of this patent is extended or adjusted under 35 U.S.C. 154(b) by 63 days.

(21) Appl. No.: 15/822,372

(22) Filed: Nov. 27, 2017

(65) Prior Publication Data
US 2018/0151892 A1 May 31, 2018

(30) Foreign Application Priority Data

Nov. 30, 2016 (TW) .............................. 105139472 A (51) Int. Cl.
*H01M 8/0258* (2016.01)
*H01M 8/0263* (2016.01)
*H01M 8/0267* (2016.01)
*H01M 8/0206* (2016.01)
*H01M 8/04014* (2016.01)
*H01M 8/1018* (2016.01)
*H01M 8/04537* (2016.01)

(52) U.S. Cl.
CPC ....... *H01M 8/0258* (2013.01); *H01M 8/0206* (2013.01); *H01M 8/0263* (2013.01); *H01M 8/0267* (2013.01); *H01M 8/04014* (2013.01); *H01M 8/04552* (2013.01); *H01M 8/04582* (2013.01); *H01M 2008/1095* (2013.01)

(58) Field of Classification Search
None
See application file for complete search history.

(56) References Cited

FOREIGN PATENT DOCUMENTS

TW 201419644 A * 5/2014
TW I476986 B 3/2015

* cited by examiner

*Primary Examiner* — Tracy M Dove
(74) *Attorney, Agent, or Firm* — Rosenberg, Klein & Lee (57) ABSTRACT

A bipolar plate structure having optimized gas flow channels is disclosed herein. It mainly comprises an anode electrode plate having a gas flow path plane molded by stamping processing and a plurality of zigzag meandering grooves formed on the gas flow path plane for a flow of hydrogen; and a cathode electrode plate having a gas flow path plane molded by stamping processing and a plurality of zigzag meandering grooves formed on the gas flow path plane for a flow of oxygen.

10 Claims, 8 Drawing Sheets

BIPOLAR PLATE STRUCTURE HAVING OPTIMIZED GAS FLOW CHANNELS

BACKGROUND OF THE INVENTION

1. Field of the Invention

The present invention relates to a bipolar plate structure having optimized gas flow channels, especially for a metal bipolar plate of a fuel cell to allow the fuel gas, oxidant, coolant and the like to be evenly distributed on a specific gas flow path plane, so as to improve corrosion resistance and mechanical strength of the bipolar plate and increase the life of the fuel cell.

2. Description of Related Art

As the traditional petrochemical energy has been gradually depleted and the use of petrochemical energy makes a significant impact on the ecological environment, governments around the world have turned to the development of low-pollution and energy-efficient energy sources. Among the new developed energy sources including solar cells, biochemical energy, fuel cells, and the like, the fuel cells have attracted attention due to having a high power generation efficiency of about 60% and low pollution.

A fuel cell is a power generation device that directly converts the chemical energy from a fuel into electricity through an electrochemical reaction of hydrogen-containing fuel (e.g. methanol, ethanol, hydrogen, and the like) with oxygen or other oxidants. In addition to electricity, fuel cells also produce a by-product of water. Compared with the traditional power generation methods, the fuel cell has the advantages of low pollution, low noise, and high energy conversion efficiency. Moreover, electricity of the fuel cell is directly converted from oxidation reactions of the fuel, so its discharge current increase as the fuel supply increases and it can continuously generate electricity as long as the fuel and oxygen are fully supplied. Accordingly, the fuel cell does not have the problems of power outage, charging and pollution.

Generally, a fuel cell is constituted by a membrane electrode assembly (MEA) and electrode plates. The MEA is referred as a core of the fuel cell for electrochemical reactions, and the electrode plate is one of the key factors influencing the commercialization of fuel cell. There are many problems of electrode plate material, flow field structure or processing cost of the fuel cell to be solved.

Specially, the traditional electrode plate is mainly made from graphite, composite carbon and metal substrates. For the electrode plate formed of the graphite and the composite carbon material, it has the advantages of conductivity and corrosion resistance, but its manufacturing process is complicated and time consuming. Moreover, the electrode plate formed of the graphite and the composite carbon material has a thickness of not less than 3 mm, which is not conducive to the miniaturization of the fuel cells. For the electrode plate formed of the metal substrates, it has the advantages of a less thickness and a light weight to reduce the volume and the weight of the fuel cells. However, this kind of fuel cell made from the metal electrode plates has lower electricity production efficiency due to a low transport capacity of flow ducts on the metal electrode plates.

For instance, the Taiwan patent TWI476986 (B), issued on 11th Mar. 2015, disclosed a fuel cell stack and its partition plate. The partition plates having identical structure are used in an anode electrode and a cathode electrode plate of a fuel cell to reduce the manufacturing costs of the fuel cell. The partition plate is mainly provided with a gas flow channel surface formed by impact molding and a corresponding coolant flow channel surface. An arrow-shaped block formed by the gas flow channel surface allows the fuel gas and the oxidant to be evenly distributed on the gas flow channel surface so as to enhance the electricity production efficiency of the fuel cell. The gas flow channel surface is provided with a plurality of flow channels, and each of the plurality of flow channels is provided with a plurality of bends. Furthermore, the bend connecting lines of the flow channels are formed as linear shape and arrow shape, and the tips of the arrow shape are located on the same horizontal line. When the two partition plates are joined together by the coolant flow channel surfaces, the grooves of the two coolant flow channel surfaces are formed as linear flow channels for conveying cooling agent. However, the above-mentioned structure having the plurality of bends on the gas flow channel surface may increase resistance to gas flow when the fuel gas (e.g. hydrogen), oxidant (e.g. oxygen) and the like flows in the flow channels for reaction and thus reduces electricity production efficiency.

SUMMARY OF THE INVENTION

In view of the above-mentioned problems, the object of the present invention is to provide a bipolar plate structure having optimized gas flow channels which is applicable to a fuel cell and has a metal bipolar plate having an innovative design of gas flow channels to allow the fuel gas, oxidant, coolant and the like to be evenly distributed on a specific gas flow path plane, so as to improve corrosion resistance and mechanical strength of the bipolar plate and increase the life of the fuel cell.

Disclosed herein is a bipolar plate structure having optimized gas flow channels. It at least comprises an anode electrode plate and a cathode electrode plate.

The anode electrode plate comprises a gas flow path plane molded by stamping processing, a plurality of zigzag meandering grooves having corresponding concaves and protrusions arranged alternately on the gas flow path plane for a flow of hydrogen, a hydrogen entry end on one side thereof, and a hydrogen outlet end on the other side thereof. The plurality of zigzag meandering grooves include a first flow path and a second flow path formed from the hydrogen entry end towards the hydrogen outlet end and a plurality of third flow paths arranged between the first flow path and the second flow path. The plurality of third flow paths are extended longitudinally and further divided into a first minor path and a second minor path. The first minor path is extended longitudinally and further transversely divided into a first sub-minor path and a second sub-minor path, and the second minor path is extended longitudinally and further transversely divided into a third sub-minor path and a fourth sub-minor path. The first sub-minor path and the second sub-minor path are extended transversely and outwardly to form a plurality of bends and further converge to the first minor path, and the third sub-minor path and the fourth sub-minor path are extended transversely and outwardly to form the plurality of bends and further converge to the second minor path. The first minor path is further converged to the second minor path again and communicated with the hydrogen outlet end for an outflow of hydrogen. The first flow path is longitudinally arranged on the gas flow path plane and further extended transversely and outwardly to form the plurality of bends, converge to the first minor path adjacent to the plurality of third flow paths and finally communicate with the hydrogen outlet end for the outflow of hydrogen. The second flow path is extended transversely and further divided into a third minor path and a fourth minor path. The third minor path is extended longitudinally and further transversely divided into a fifth sub-minor path and a sixth sub-minor path, and the fourth minor path is extended transversely and further divided into a seventh sub-minor path and an eighth sub-minor path. The fifth sub-minor path and the sixth sub-minor path are extended transversely and outwardly to form the plurality of bends and further converge to the third minor path. The third minor path is further converged to the second minor path adjacent to the plurality of third flow paths and finally communicated with the hydrogen outlet end for the outflow of hydrogen. The seventh sub-minor path and the eighth sub-minor path are also extended transversely and inwardly to form the plurality of bends and further converge to the fourth minor path. The fourth minor path is longitudinally arranged on the gas flow path plane and finally communicated with the hydrogen outlet end for the outflow of hydrogen. The first through eighth sub-minor paths are formed as an inverted V shape having a plurality of tips arranged on the same horizontal line.

The cathode electrode plate comprises a gas flow path plane molded by stamping processing, a plurality of zigzag meandering grooves having corresponding concaves and protrusions arranged alternately on the gas flow path plane for a flow of oxygen, an oxygen entry end at one end thereof, and an oxygen outlet end at the other end thereof. The plurality of zigzag meandering grooves include a fourth flow path and a fifth flow path formed from the oxygen entry end towards the oxygen outlet end and a plurality of sixth flow paths arranged between the fourth flow path and the fifth flow path. The fourth flow path is longitudinally arranged on the gas flow path plane and further transversely divided into a fifth minor path and a sixth minor path. The fifth minor path and the sixth minor path are extended transversely and outwardly to form a plurality of bends, converge to the fourth flow path and finally communicate with the oxygen outlet end for an outflow of oxygen. The plurality of sixth flow paths are extended longitudinally and further transversely divided into a seventh minor path and an eighth minor path. The seventh minor path and the eighth minor path extended transversely and inwardly to form the plurality of bends, converge to the plurality of sixth flow paths and finally communicate with the oxygen outlet end for the outflow of oxygen. The fifth flow path is extended longitudinally to connect to the plurality of bends, longitudinally arranged on the gas flow path plane and finally communicated with the oxygen outlet end for the outflow of oxygen. The fifth through eighth minor paths are formed as an inverted V shape having a plurality of tips arranged on the same horizontal line.

The bipolar plate structure having optimized gas flow channels further comprises a hydrogen flow path and an oxygen flow path which are formed by the plurality of zigzag meandering grooves on the gas flow path plane of the anode electrode plate affixing with the plurality of zigzag meandering grooves on the gas flow path plane of the cathode electrode plate for guiding the flow of hydrogen and oxygen; a plurality of vacancies formed by the plurality of zigzag meandering grooves on the gas flow path plane of the anode electrode plate affixing with the plurality of zigzag meandering grooves on the gas flow path plane of the cathode electrode plate; and a coolant flow path formed by the plurality of vacancies for a flow of a coolant.

According to an embodiment of the present invention, the anode electrode plate and the cathode electrode plate are provided with a coolant inlet on one side thereof and a coolant outlet corresponding to the coolant inlet on the other side thereof for communication with the plurality of vacancies.

According to an embodiment of the present invention, the coolant inlet and the coolant outlet are further respectively provided with a coolant entrance support and a coolant export support.

According to an embodiment of the present invention, the anode electrode plate and the cathode electrode plate are made of a metal material.

According to an embodiment of the present invention, the metal material is stainless steel.

According to an embodiment of the present invention, the anode electrode plate and the cathode electrode plate have a thickness ranging from 0.1 mm to 0.2 mm.

According to an embodiment of the present invention, the first flow path, the second flow path and the plurality of third flow paths have identical overall lengths.

According to an embodiment of the present invention, the fourth flow path, the fifth flow path and the plurality of sixth flow paths have identical overall lengths.

According to an embodiment of the present invention, the anode electrode plate and the cathode electrode plate are further provided with a first quick connector and a second quick connector respectively on one side thereof for measuring voltage and current.

In addition, disclosed herein is a fuel cell having a plurality of fuel cell units connected in series, each of the plurality of fuel cell units comprises a membrane electrode assembly, at least two bipolar plate structures having optimized gas flow channels as described above and reversely disposed on each other, and at least two sealing members, wherein each of two sides of the membrane electrode assembly is sequentially disposed with one of the at least two sealing members and one of the at least two bipolar plate structures having optimized gas flow channels.

Accordingly, the present invention has meandering flow paths including the first flow path, the second flow path, and the plurality of third flow paths on the anode electrode plate and the fourth flow path, the fifth flow path, and the plurality of sixth flow paths on the cathode electrode plate to form partition blocks having a large number of linear shape and arrow shape, which can maintain the mechanical strength of the fuel cell, allow the fuel gas (e.g. hydrogen) and the oxidant (e.g. oxygen) to be evenly distributed on the gas flow path plane without resistance, and ensure the sufficient concentration of the reaction gas to enter the membrane electrode assembly (MEA), so as to conduct the full reaction and enhance the electricity production efficiency of the fuel cell.

Furthermore, the gas flow path planes of the present invention are molded by stamping processing a stainless steel plate which has advantages of low thickness and low weight, so the volume of the fuel cell can be decreased to meet the demand for lightweight. Moreover, after formation, the stainless steel plate is processed by surface modifications, e.g. coating process, gas heat treatment and the like, to improve the corrosion resistance of metal plate and increase the mechanical strength, which can also increase the life of the fuel cell.

Finally, the present invention has the plurality of vacancies formed by the anode electrode plate affixing with the cathode electrode plate to form the coolant flow path, so the contacting portions are sufficient to withstand the pressure of compression in assembling the fuel cell. By the confluence design of the gas flow paths, the present invention can also maximize the coolant flow field formed by the back side of the gas flow path plane of the anode electrode plate affixing with the back side of the gas flow path plane of the cathode electrode plate to meet the cooling requirements and to provide a higher power density related to weight.

DETAILED DESCRIPTION OF THE PREFERRED EMBODIMENT

Hereinafter, an exemplary embodiment of the present invention will be described in detail with reference to the accompanying drawings.

The main function of the electrode plates of a fuel cell is to guide reaction gases such as the fuel gas (e.g. hydrogen) and the oxidant (e.g. oxygen) respectively from a hydrogen entry end of an anode electrode plate and an oxygen entry end of the cathode electrode plate to the flow paths and to guide the coolant from the coolant inlets to the flow paths located on the back sides of the anode electrode plate and the cathode electrode plate. By an innovative design of the gas flow paths, the hydrogen and the oxygen are distributed on a reaction area, and the unused reaction gas and coolant are guided to flow out of the flow paths. The anode electrode plate and the cathode electrode plate are respectively disposed on two sides of a membrane electrode assembly. The principle of operation is that the fuel gas (e.g. hydrogen) and the oxidant (e.g. oxygen) respectively from the anode electrode plate and the cathode electrode plate flow into the fuel cell; after a reaction by the membrane electrode assembly, the hydrogen molecule at the anode electrode plate is decomposed into two protons and two electrons by oxidation reactions; the protons are attracted by oxygen and drawn from the anode to the cathode through an external circuit for reacting to the electrons and oxygen and further forming water molecules. The operation method of the fuel cell is well-known in the prior art and is not the focus of the present invention and will not be repeated described here.

The present invention is aim at providing a metal bipolar plate having specific a design and an arrangement of gas flow channels, so as to solve the problems of the prior art, including that the reaction gas cannot be easily distributed on the gas flow path planes of the anode electrode plate and the cathode electrode plate evenly and without resistance.

Figure 1:
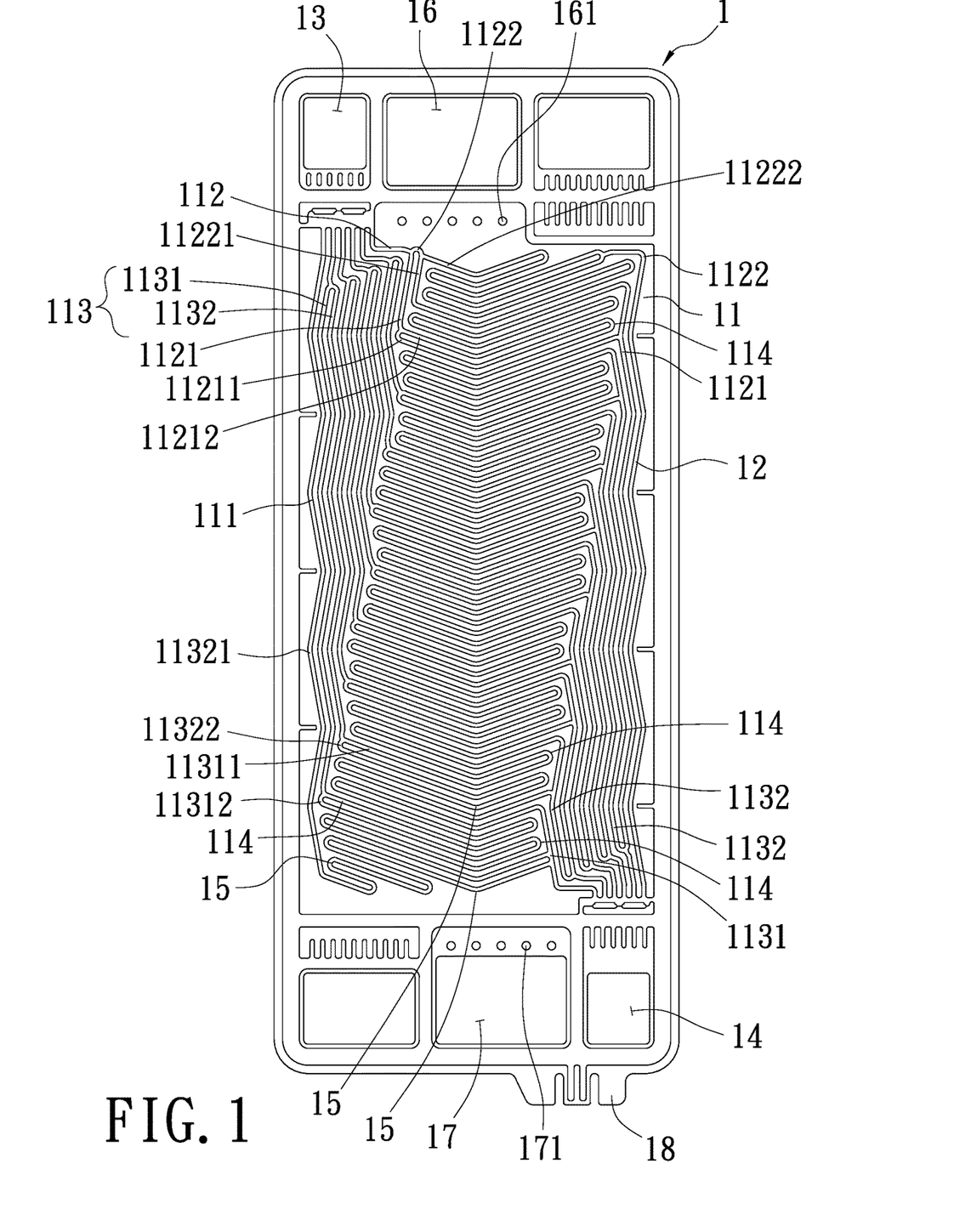
FIG. 1 is a top view showing an anode electrode plate of a bipolar plate structure having optimized gas flow channels according to the present invention.
Figure 2:
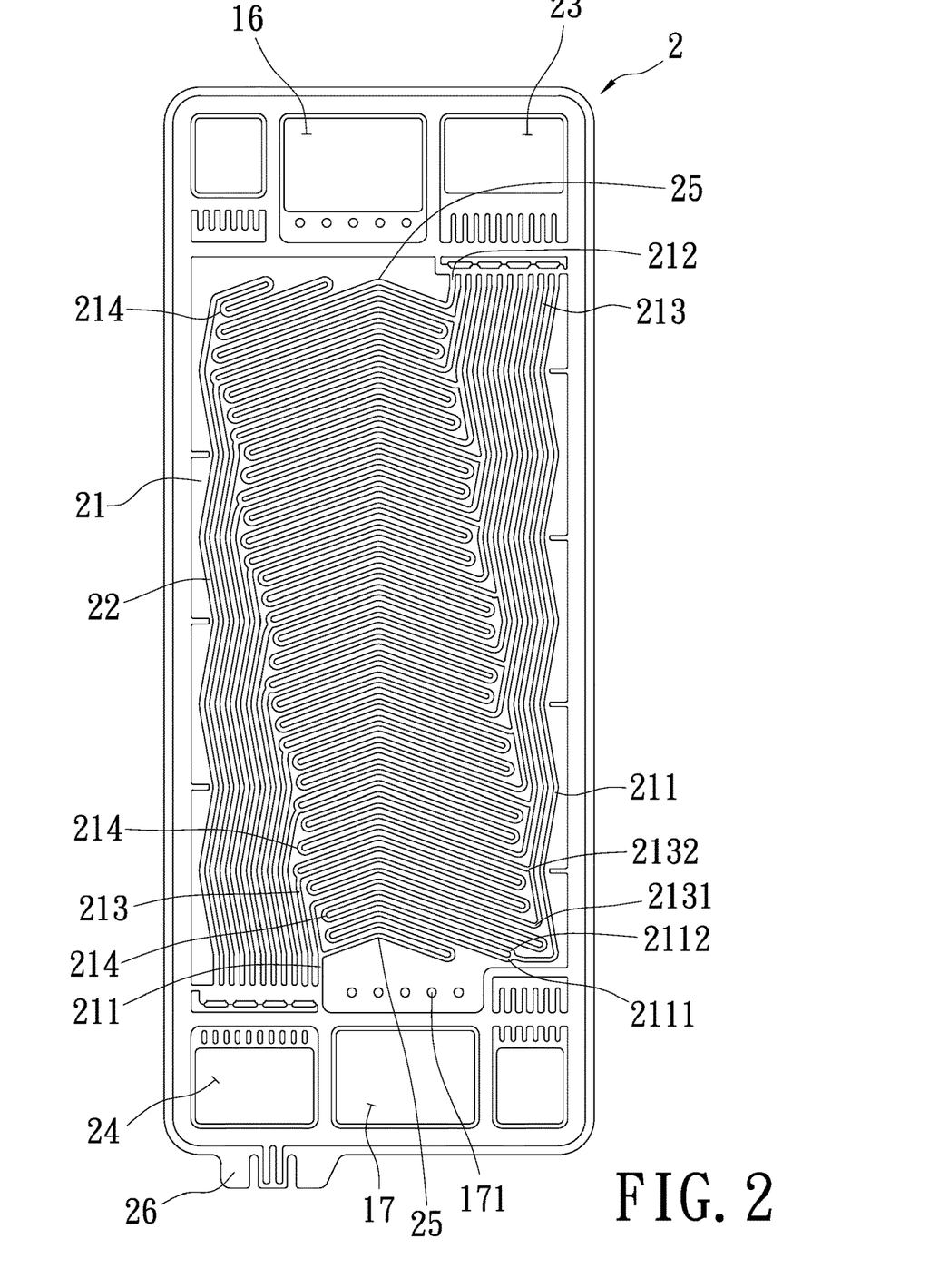
FIG. 2 is a top view showing a cathode electrode plate of a bipolar plate structure having optimized gas flow channels according to the present invention.

As showed in FIGS. 1-2, a bipolar plate structure having optimized gas flow channels according to the present invention is disclosed. It at least comprises an anode electrode plate (1) and a cathode electrode plate (2).

The anode electrode plate (1) comprises a gas flow path plane (11) molded by stamping processing, a plurality of zigzag meandering grooves (12) formed on the gas flow path plane (11) for a flow of hydrogen, a hydrogen entry end (13) on one side thereof, and a hydrogen outlet end (14) on the other side thereof. The plurality of zigzag meandering grooves (12) include a first flow path (111) and a second flow path (112) formed from the hydrogen entry end (13) towards the hydrogen outlet end (14) and a plurality of third flow paths (113) arranged between the first flow path (111) and the second flow path (112). The plurality of third flow paths (113) are extended longitudinally and further divided into a first minor path (1131) and a second minor path (1132). The first minor path (1131) is extended longitudinally and further transversely divided into a first sub-minor path (11311) and a second sub-minor path (11312), and the second minor path (1132) is extended longitudinally and further transversely divided into a third sub-minor path (11321) and a fourth sub-minor path (11322). The first sub-minor path (11311) and the second sub-minor path (11312) are extended transversely and outwardly to form a plurality of bends (114) and further converge to the first minor path (1131), and the third sub-minor path (11321) and the fourth sub-minor path (11322) are extended transversely and outwardly to form the plurality of bends (114) and further converge to the second minor path (1132). The first minor path (1131) is further converged to the second minor path (1132) again and then communicated with the hydrogen outlet end (14) for an outflow of hydrogen. The first flow path (111) is longitudinally arranged on the gas flow path plane (11) and further extended transversely and outwardly to form the plurality of bends (114), converge to the first minor path adjacent to the plurality of third flow paths (113) and finally communicate with the hydrogen outlet end (14) for the outflow of hydrogen. The second flow path (112) is extended transversely and further divided into a third minor path (1121) and a fourth minor path (1122). The third minor path (1121) is extended longitudinally and further transversely divided into a fifth sub-minor path (11211) and a sixth sub-minor path (11212), and the fourth minor path (1122) is extended transversely and further divided into a seventh sub-minor path (11221) and an eighth sub-minor path (11222). The fifth sub-minor path (11211) and the sixth sub-minor path (11212) are extended transversely and outwardly to form the plurality of bends (114) and further converge to the third minor path (1121). The third minor path (1121) is further converged to the second minor path (1132) adjacent to the plurality of third flow paths (113) and finally communicated with the hydrogen outlet end (14) for the outflow of hydrogen. The seventh sub-minor path (11221) and the eighth sub-minor path (11222) are also extended transversely and inwardly to form the plurality of bends (114) and further converge to the fourth minor path (1122). The fourth minor path (1122) is longitudinally arranged on the gas flow path plane (11) and finally communicated with the hydrogen outlet end (14) for the outflow of hydrogen. The transversely distributed flow paths including the first through eighth sub-minor paths are formed as an inverted V shape having a plurality of tips (15) arranged on the same horizontal line. It is worth mentioning that the terms of "extended outwardly to form the plurality of bends (114)" and "extended inwardly to form the plurality of bends (114)" of the transversely distributed flow paths are determined by a normal vector of the transversely distributed flow paths extended toward a direction out of the flow paths or near the flow paths. Namely, the gas flow path in the direction of the normal vector toward the gas flow path is called "inwardly" bending while the gas flow path away from the normal vector toward the gas flow path is called "outwardly" bending. Furthermore, according to an embodiment of the present invention, four third flow paths (113) are located between the first flow path (111) and the second flow path (112), and the first flow path (111), the second flow path (112) and the third flow paths (113) have identical overall lengths so that the resistance of each gas flow path are similar. The abovementioned number of gas flow paths is only one of the preferred embodiments. Indeed, the number of the third flow paths (113) of the present invention may be less than or more than four and do not affect the actual implementation of the present invention.

The cathode electrode plate (2) comprises a gas flow path plane (21) molded by stamping processing, a plurality of zigzag meandering grooves (22) formed on the gas flow path plane (21) for a flow of oxygen, an oxygen entry end (23) at one end thereof, and an oxygen outlet end (24) at the other end thereof. The plurality of zigzag meandering grooves (22) include a fourth flow path (211) and a fifth flow path (212) formed from the oxygen entry end (23) towards the oxygen outlet end (24) and a plurality of sixth flow paths (213) arranged between the fourth flow path (211) and the fifth flow path (212). The fourth flow path (211) is longitudinally arranged on the gas flow path plane (21) and further transversely divided into a fifth minor path (2111) and a sixth minor path (2112). The fifth minor path (2111) and the sixth minor path (2112) are extended transversely and outwardly to form a plurality of bends (214), converge to the fourth flow path (211) and finally communicate with the oxygen outlet end (24) for an outflow of oxygen. The plurality of sixth flow paths (213) are extended longitudinally and further transversely divided into a seventh minor path (2131) and an eighth minor path (2132). The seventh minor path (2131) and the eighth minor path (2132) extended transversely and inwardly to form the plurality of bends (214), converge to the plurality of sixth flow paths (213) and finally communicate with the oxygen outlet end (24) for the outflow of oxygen. The fifth flow path (212) is extended longitudinally to connect to the plurality of bends (214), longitudinally arranged on the gas flow path plane (21) and finally communicated with the oxygen outlet end (24) for the outflow of oxygen. The transversely distributed flow paths including the fifth through eighth minor paths are formed as an inverted V shape having a plurality of tips (25) arranged on the same horizontal line. According to an embodiment of the present invention, nine sixth flow paths (213) are located between the fourth flow path (211) and the fifth flow path (212), and the fourth flow path (211), the fifth flow path (212) and the sixth flow paths (213) have identical overall lengths so that the resistance of each gas flow path are similar. The abovementioned number of gas flow paths is only one of the preferred embodiments. Indeed, the number of the sixth flow paths (213) of the present invention may be less than or more than nine and do not affect the actual implementation of the present invention.

Furthermore, the anode electrode plate (1) is reversely disposed on the cathode electrode plate (2). The bipolar plate structure having optimized gas flow channels further comprises a hydrogen flow path (3) and an oxygen flow path (4) which are formed by the plurality of zigzag meandering grooves (12) on the gas flow path plane (11) of the anode electrode plate (1) affixing with the plurality of zigzag meandering grooves (22) on the gas flow path plane (21) of the cathode electrode plate (2) for guiding the flow of hydrogen and oxygen; a plurality of vacancies (5) formed by the plurality of zigzag meandering grooves (12) on the gas flow path plane (11) of the anode electrode plate (1) affixing with the plurality of zigzag meandering grooves (22) on the gas flow path plane (21) of the cathode electrode plate (2); and a coolant flow path (6) formed by the plurality of vacancies (5) for a flow of a coolant.

Figure 3:
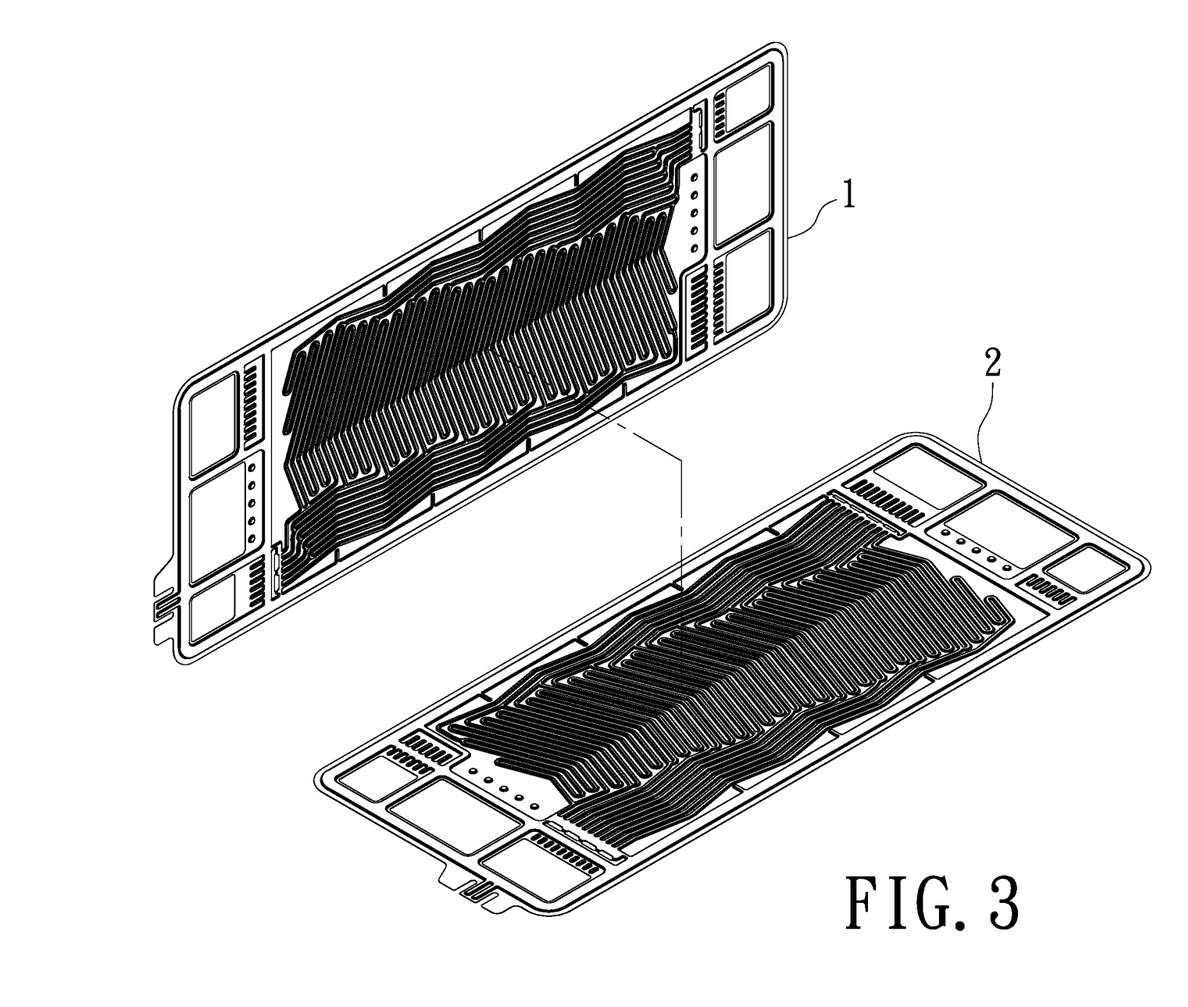
FIG. 3 is a schematic diagram showing a bipolar plate structure having optimized gas flow channels in assembly according to the present invention.
Figure 4:
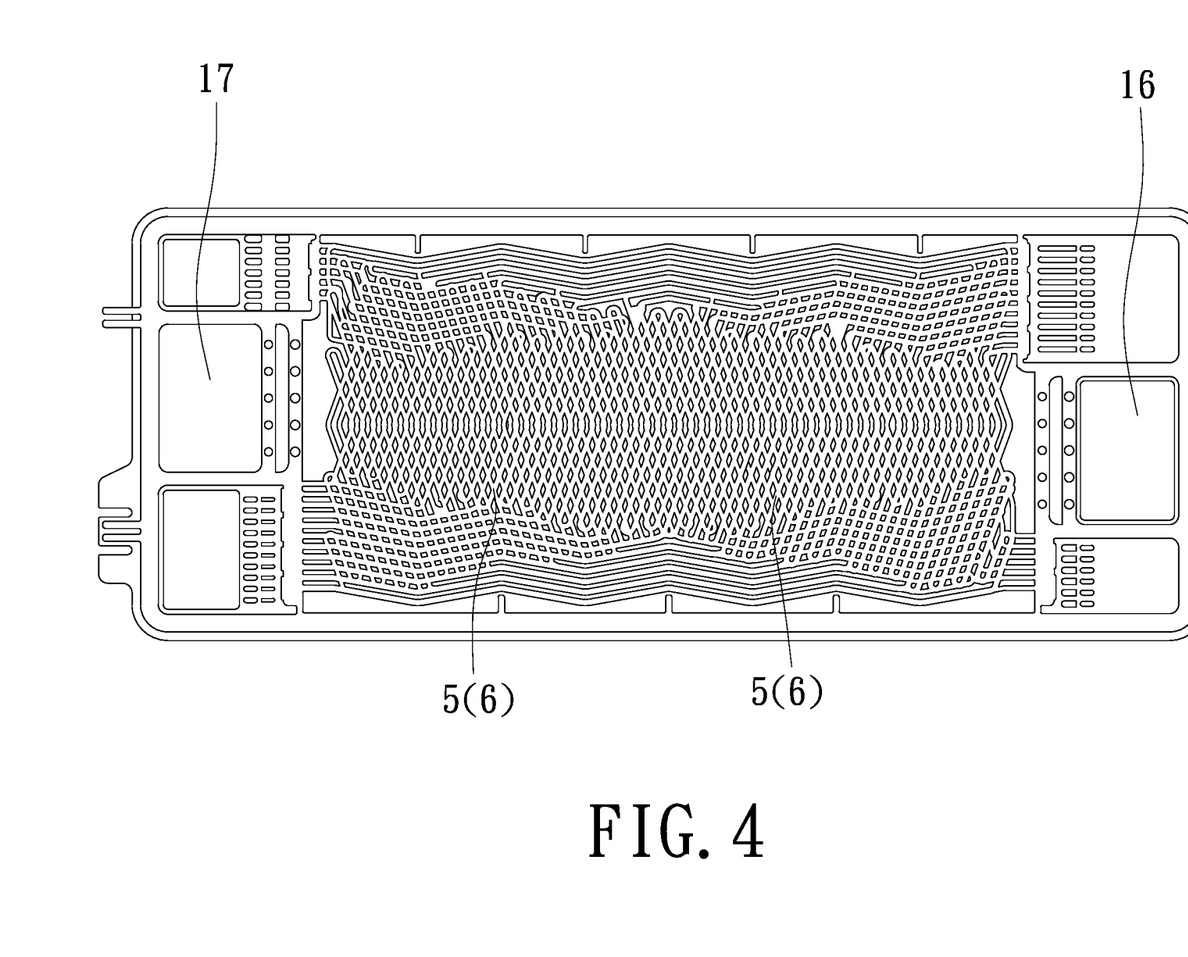
FIG. 4 is a schematic diagram showing a coolant flow path of a bipolar plate structure having optimized gas flow channels according to the present invention.

Referring to FIGS. 3-4, a schematic diagram showing a bipolar plate structure having optimized gas flow channels in assembly and a schematic diagram showing a coolant flow path of a bipolar plate structure having optimized gas flow channels according to the present invention are respectively disclosed. As shown in FIG. 3, the anode electrode plate (1) is reversely disposed on the cathode electrode plate (2) in such a manner of being up-and-down inverted 180 degrees. As shown in FIG. 4, the back sides of the gas flow path planes (11) (21) of the anode electrode plate (1) and the cathode electrode plate (2) are also named the outer sides of the anode electrode plate (1) and the cathode electrode plate (2). When the outer side of the anode electrode plate (1) and the outer side of the cathode electrode plate (2) are stacked on each other, contacting portions of the anode electrode plate (1) and the cathode electrode plate (2) form an isolation whereas the non-contacting vacancies (5) form the flow path, namely the coolant flow path (6), for the flow of the coolant liquid. This is also the reason that the transversely distributed flow paths are designed to be an inverted V shape. In such a case, the grid-like spaces formed by the anode electrode plate (1) stacking on the cathode electrode plate (2) can be used as a passage of a coolant circulation. The coolant flow field is as large as possible to maximize the cooling effects. Furthermore, the contacting portions must be sufficient to withstand the pressure of compression in assembling the fuel cell. Accordingly, the metal bipolar plate comprising the anode electrode plate (1) and the cathode electrode plate (2) has a flexible and delicate design to meet cooling requirements and to provide a higher power density related to weight. Additionally, the anode electrode plate (1) and the cathode electrode plate (2) are provided with a coolant inlet (16) on one side thereof and a coolant outlet (17) corresponding to the coolant inlet (16) on the other side thereof for communication with the coolant flow path (6) formed by the plurality of vacancies (5) for an inflow of the coolant. The coolant inlet (16) and the coolant outlet (17) are further respectively provided with a coolant entrance support (161) and a coolant export support (171).

Figure 5:
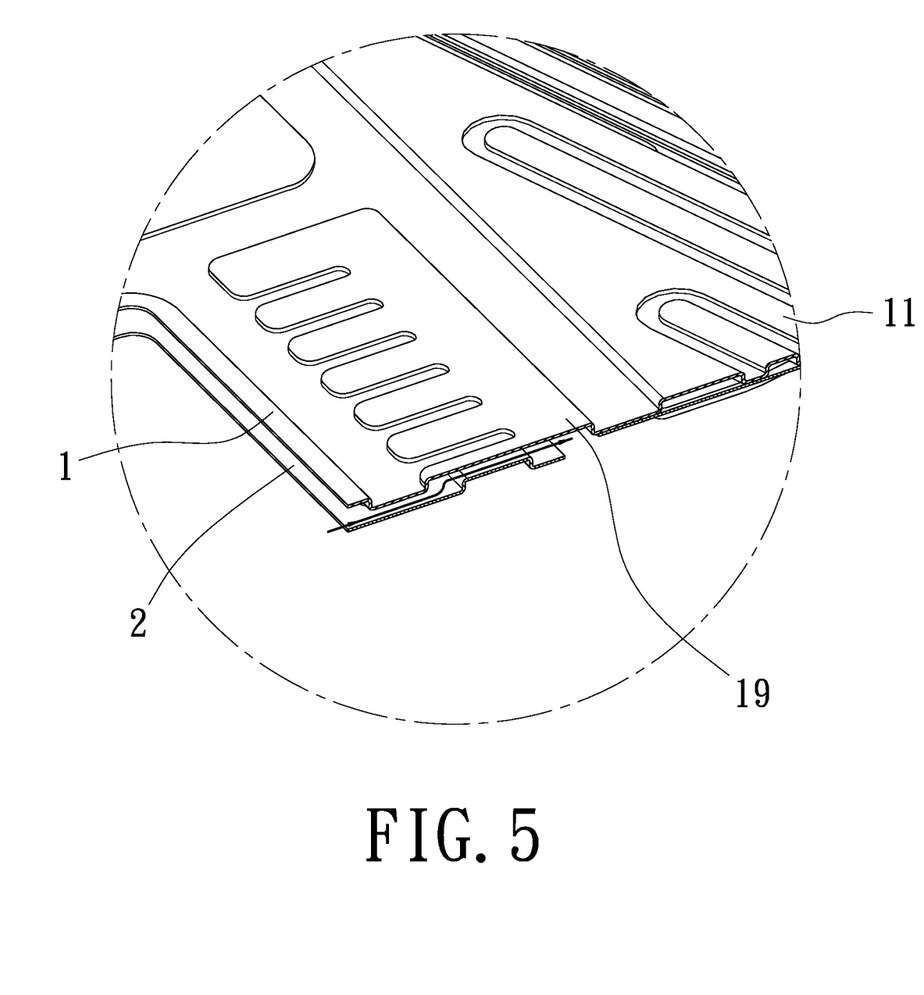
FIG. 5 is a sectional view showing a gas inlet of a bipolar plate structure having optimized gas flow channels according to the present invention.

Referring to FIG. 5, a sectional view showing a gas inlet of a bipolar plate structure having optimized gas flow channels according to the present invention is disclosed. In an embodiment of an anode electrode plate (1) and a cathode electrode plate (2) reversely disposed on each other, the hydrogen of fuel gas flows into the hydrogen entry end (13), and then passes through a hydrogen inlet (19) and a gap between the hydrogen inlet (19) and the cathode electrode plate (2) for further flowing into the gas flow path plane (11) of the anode electrode plate (1). The arrow shown in FIG. 5 is the route of hydrogen.

In addition, the anode electrode plate (1) is preferentially made of a metal material, more preferentially a stainless steel plate having a thickness ranging from 0.1 mm to 0.2 mm, more preferentially 0.15 mm, and the anode electrode plate (1) has a total reaction area of 202.7 cm$^2$. The elongation, width and the total reaction area of the flow paths of the anode electrode plate (1) are 0.5 mm, 1 mm and 132 cm$^2$, respectively.

In addition, the cathode electrode plate (2) is preferentially made of a metal material, more preferentially a stainless steel plate having a thickness ranging from 0.1 mm to 0.2 mm, more preferentially 0.15 mm, and the cathode electrode plate (2) has a total reaction area of 202.7 cm$^2$. The elongation, width and the total reaction area of the flow paths of the cathode electrode plate (2) are 0.5 mm, 1 mm and 132 cm$^2$, respectively.

Preferentially, the anode electrode plate (1) and the cathode electrode plate (2) are further provided with a first quick connector (18) and a second quick connector (26) respectively on one side thereof for measuring voltage and current.

Figure 6:
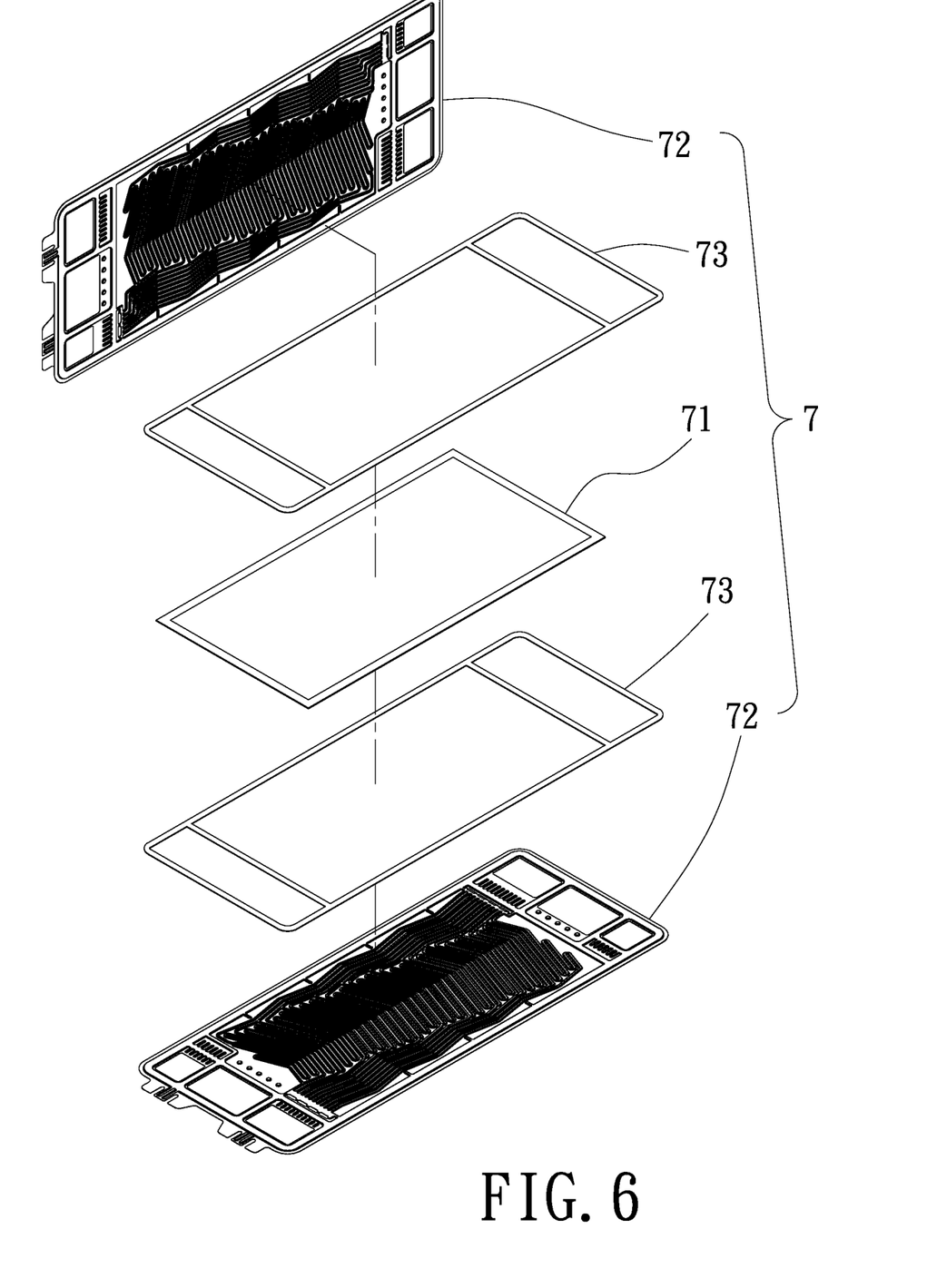
FIG. 6 is a schematic diagram showing a fuel cell unit of a bipolar plate structure having optimized gas flow channels according to the present invention.
Figure 7:
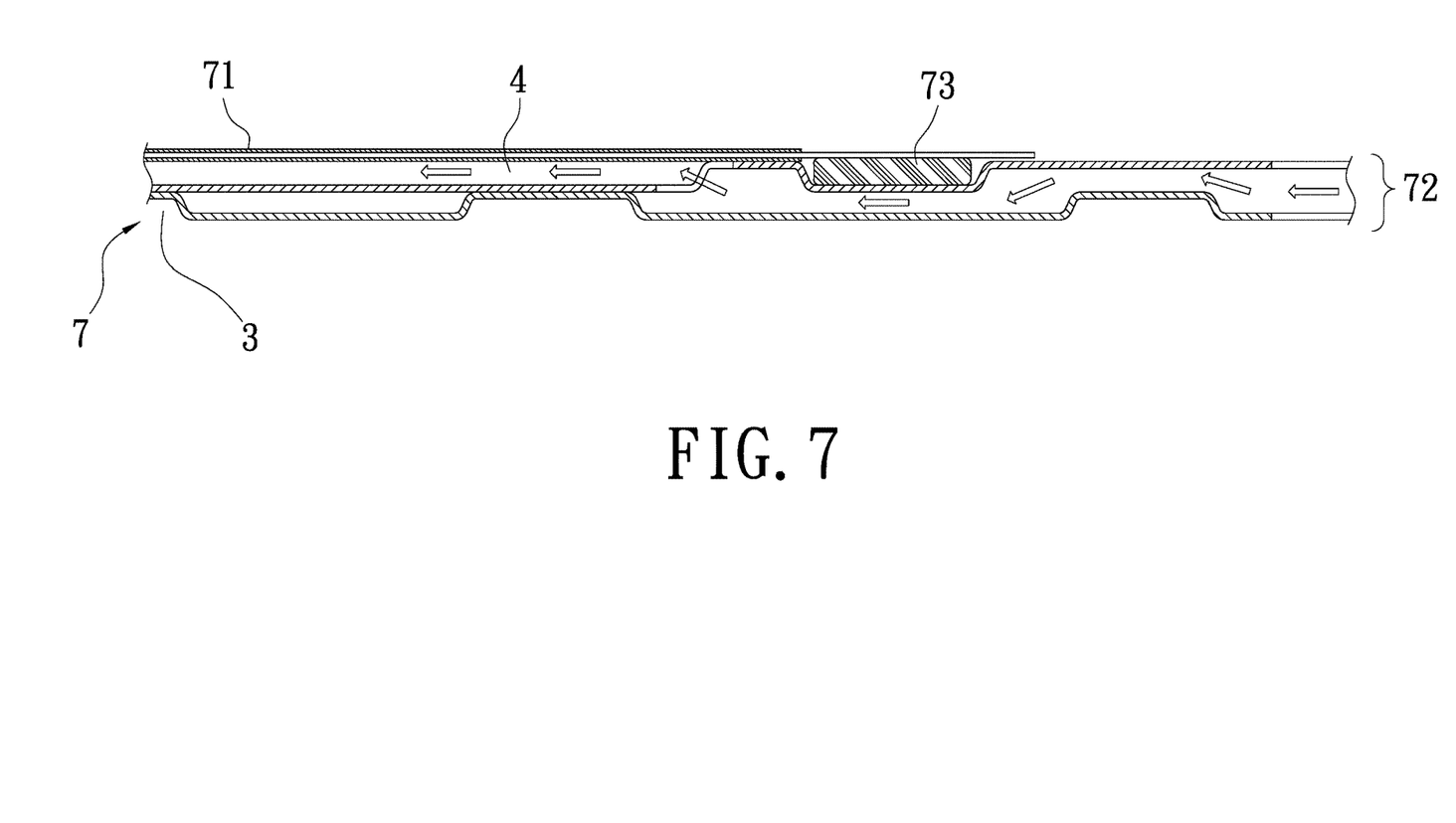
FIG. 7 is a sectional view showing a fuel cell unit of a bipolar plate structure having optimized gas flow channels according to the present invention.

Referring to FIGS. 6-7, a schematic diagram and a sectional view showing a fuel cell unit of a bipolar plate structure having optimized gas flow channels according to the present invention are respectively disclosed. The present also provides a fuel cell having a plurality of fuel cell units (7) connected in series, each of the plurality of fuel cell units (7) comprises a membrane electrode assembly (71), at least two bipolar plate structures having optimized gas flow channels as described above and reversely disposed on each other, and at least two sealing members (73), wherein each of two sides of the membrane electrode assembly (71) is sequentially disposed with one of the at least two sealing members (73) and one of the at least two bipolar plate structures having optimized gas flow channels (namely at least two drainage channel bipolar plates (72)). Each of the at least two bipolar plate structures comprises an anode electrode plate (1) and a cathode electrode plate (2).

Figure 8:
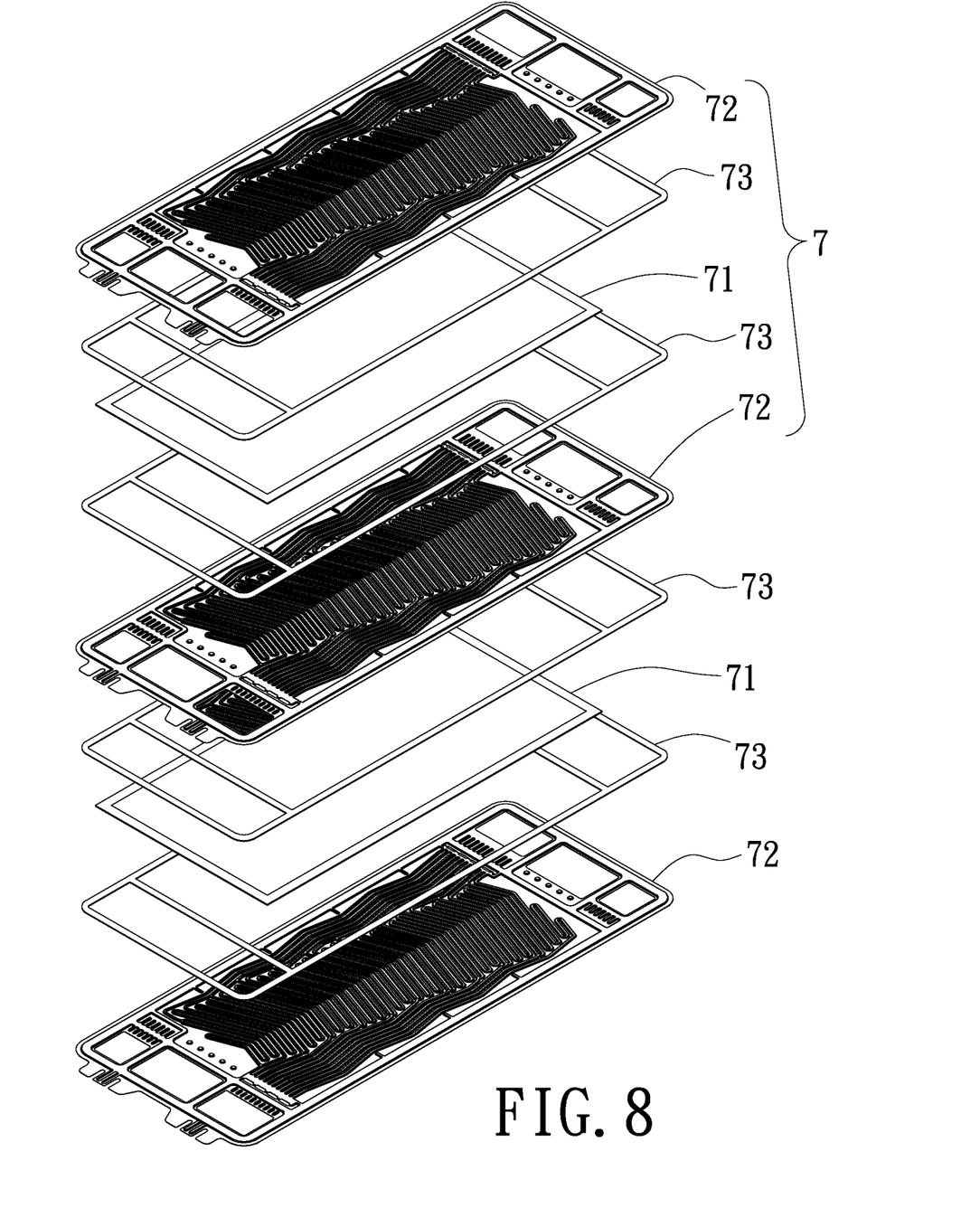
FIG. 8 is a schematic diagram showing a plurality of fuel cell units in assembly according to the present invention.

Referring to FIG. 8, a schematic diagram showing a plurality of fuel cell units in assembly according to the present invention is disclosed. At the oxygen entry end (23), the anode electrode plate (1) is reversely stacked on the cathode electrode plate (2) to form a drainage channel bipolar plate (72) having drainage channels, namely the hydrogen flow path (3) and the oxygen flow path (4), for guiding the flow of hydrogen and oxygen. The arrow shown in FIG. 7 is the route of oxygen entered from the oxygen entry end (23). The at least two sealing members (73) are completely sealed to prevent gas leakages.

In an actual practice according to the above description, the anode electrode plate (1) and the cathode electrode plate (2) are separately made of a metal material, more preferentially a stainless steel plate having a thickness ranging from 0.1 mm to 0.2 mm, more preferentially 0.15 mm, and having a total reaction area of 202.7 cm$^2$. The elongation, width and the total reaction area of the flow paths of the stainless steel plate are 0.5 mm, 1 mm and 132 cm$^2$, respectively. The stainless steel plate is molded by stamping processing to form the gas flow paths.

In an actual practice according to the above description, the plurality of fuel cell units (7) are further connected in series to form the fuel cell to get enough electricity production efficiency. Among the plurality of fuel cell units (7), the anode electrode plate (1) is reversely disposed on the cathode electrode plate (2). The gas flow path plane (11) of the anode electrode plate (1) is reversely affixed with the gas flow path plane (21) of the cathode electrode plate (2) to form drainage channels, namely the hydrogen flow path (3) and the oxygen flow path (4), for guiding the flow of hydrogen and oxygen, and to form the plurality of vacancies (5) for further forming a coolant flow path for a flow of a coolant. The back sides of the gas flow path planes (11) (21) of the anode electrode plate (1) and the cathode electrode plate (2) are also named the outer sides of the anode electrode plate (1) and the cathode electrode plate (2). When the outer side of the anode electrode plate (1) and the outer side of the cathode electrode plate (2) are stacked on each other, contacting portions of the anode electrode plate (1) and the cathode electrode plate (2) form an isolation whereas the non-contacting vacancies (5) form the flow path, namely the coolant flow path (6), for the flow of the coolant liquid. This is also the reason that the transversely distributed flow paths are designed to be an inverted V shape. In such a case, the grid-like spaces formed by the anode electrode plate (1) stacking on the cathode electrode plate (2) can be used as a passage of a coolant circulation. The coolant flow field is as large as possible to maximize the cooling effects. Furthermore, the contacting portions must be sufficient to withstand the pressure of compression in assembling the fuel cell. Accordingly, the metal bipolar plate comprising the anode electrode plate (1) and the cathode electrode plate (2) has a flexible and delicate design to meet cooling requirements and to provide a higher power density related to weight.

Additionally, the anode electrode plate (1) is provided with six flow paths including a first flow path (111) in the top position, a second flow path (112) in the bottom position, and four third flow paths (113) between the first flow path (111) and the second flow path (112). The first flow path (111), the second flow path (112) and the third flow paths (113) have identical overall lengths so that the resistance of each gas flow path are similar. The cathode electrode plate (2) is provided with eleven flow paths including a fourth flow path (211) in the top position, a fifth flow path (212) in the bottom position, and nine sixth flow paths (213) between the fourth flow path (211) and the fifth flow path (212). The fourth flow path (211), the fifth flow path (212) and the sixth flow paths (213) have identical overall lengths so that the resistance of each gas flow path are similar.

Furthermore, the anode electrode plate (1) and the cathode electrode plate (2) of the bipolar plate structure having optimized gas flow channels as described in the present invention can be disposed with a conventional membrane electrode assembly (71) and at least two sealing members (73) to form a fuel cell unit (7). In such a case, the anode electrode plate (1) is reversely stacked on the cathode electrode plate (2) to form a drainage channel bipolar plate (72) having drainage channels, namely the hydrogen flow path (3) and the oxygen flow path (4), for guiding the flow of hydrogen and oxygen. Each of two sides of the membrane electrode assembly (71) is sequentially disposed with one of the at least two sealing members (73) and one drainage channel bipolar plate (72). The at least two sealing members (73) are completely sealed to prevent gas leakages. The plurality of fuel cell units (7) are further connected in series to form the fuel cell to get enough electricity production efficiency.

Compared with the technique available now, the present invention has the following advantages:

1. The bipolar plate structure of the present invention has meandering flow paths including the first flow path, the second flow path, and the plurality of third flow paths on the anode electrode plate and the fourth flow path, the fifth flow path, and the plurality of sixth flow paths on the cathode electrode plate to form partition blocks having a large number of linear shape and arrow shape, which can maintain the mechanical strength of the fuel cell, allow the fuel gas (e.g. hydrogen) and the oxidant (e.g. oxygen) to be evenly distributed on the gas flow path plane without resistance, and ensure the sufficient concentration of the reaction gas to enter the membrane electrode assembly (MEA), so as to conduct the full reaction and enhance the electricity production efficiency of the fuel cell.

2. The gas flow path planes of the bipolar plate structure of the present invention are molded by stamping processing a stainless steel plate which has advantages of low thickness and low weight, so the volume of the fuel cell can be decreased to meet the demand for lightweight. Moreover, after formation, the stainless steel plate is processed by surface modifications, e.g. coating process, gas heat treatment and the like, to improve the corrosion resistance of metal plate and increase the mechanical strength, which can also increase the life of the fuel cell.

3. The plurality of vacancies of the bipolar plate structure of the present invention is formed by the anode electrode plate affixing with the cathode electrode plate to form the coolant flow path, so the contacting portions are sufficient to withstand the pressure of compression in assembling the fuel cell. By the confluence design of the gas flow paths, the present invention can also maximize the coolant flow field formed by the back side of the gas flow path plane of the anode electrode plate affixing with the back side of the gas flow path plane of the cathode electrode plate to meet the cooling requirements and to provide a higher power density related to weight.

What is claimed is:

1. A bipolar plate structure having optimized gas flow channels, comprises:

an anode electrode plate comprising a first gas flow path plane molded by stamping processing, a first plurality of zigzag meandering grooves formed on the first gas flow path plane for a flow of hydrogen, a hydrogen entry end on a first side of said first gas flow path plane, and a hydrogen outlet end on a second side of said first gas flow path plane opposite to said first side thereof, wherein the first plurality of zigzag meandering grooves include a first flow path and a second flow path formed from the hydrogen entry end towards the hydrogen outlet end and a plurality of third flow paths arranged between the first flow path and the second flow path, wherein the plurality of third flow paths are extended longitudinally and further divided into a first minor path and a second minor path; wherein the first minor path includes a first longitudinal portion extended longitudinally along said anode electrode plate and a first crossing portion divided into a first sub-minor path and a second sub-minor path, said first and second sub-minor paths extending transversely to said first longitudinal portion of said first minor path; wherein the second minor path includes a second longitudinal portion extended longitudinally along said anode electrode plate and a second crossing portion divided into a third sub-minor path and a fourth sub-minor path, said third and fourth sub-minor paths extending transversely to said second longitudinal portion of said second minor path; wherein said first and second sub-minor paths constitute said first crossing portion of said first minor path extending in a transverse direction relative to said first longitudinal portion of said first minor path, and wherein said third and fourth sub-minor paths constitute said second crossing portion of said second minor path extending in a transverse direction relative to said second longitudinal portion of said second minor path; the first sub-minor path and the second sub-minor path extending transversely and outwardly relative to said first longitudinal portion to form a first plurality of bends and to converge into the first minor path; the third sub-minor path and the fourth sub-minor path extending transversely and outwardly relative to said second longitudinal portion to form the first plurality of bends and to converge into the second minor path; the first minor path being converged into the second minor path and communicating with the hydrogen outlet end for an outflow of hydrogen; wherein the first flow path is formed with a third longitudinal portion longitudinally arranged on the first gas flow path plane and with a third crossing portion extended transversely and outwardly relative to said third longitudinal portion to form a second plurality of bends and to converge into the first minor path adjacent to the plurality of third flow paths and to communicate with the hydrogen outlet end for the outflow of hydrogen; wherein the second flow path is extended transversely to said third longitudinal portion and further divided into a third minor path and a fourth minor path; wherein the third minor path is configured with a fourth longitudinal portion extended longitudinally along said anode electrode plate and a fourth crossing portion extending transversely to said fourth longitudinal portion, said fourth crossing portion being divided into a fifth sub-minor path and a sixth sub-minor path extending transversely to said fourth longitudinal portion of said third minor path; wherein the fourth minor path is configured with a fifth crossing portion extended transversely to said fourth longitudinal portion and divided into a seventh sub-minor path and an eighth sub-minor path; the fifth sub-minor path and the sixth sub-minor path extending transversely and outwardly relative to said fourth longitudinal portion of said third minor path to form a third plurality of bends and to converge into the third minor path;

wherein the third minor path converges into the second minor path adjacent to the plurality of the third flow paths and communicates with the hydrogen outlet end for the outflow of hydrogen; wherein the seventh sub-minor path and the eighth sub-minor path are extended transversely and inwardly relative to said first longitudinal portion to form a fourth plurality of bends and converge into the fourth minor path; wherein the fourth minor path is longitudinally arranged on the first gas flow path plane in communication with the hydrogen outlet end for the outflow of hydrogen, and wherein the first through eighth sub-minor paths are formed in an inverted V shape having a plurality of tips aligned in a first line along said first gas flow path plane;

a cathode electrode plate reversely disposed relative to the anode electrode plate and comprising a second gas flow path plane molded by stamping processing, a second plurality of zigzag meandering grooves formed on the second gas flow path plane for a flow of oxygen, an oxygen entry end at a first end of said second gas flow path plane, and an oxygen outlet end at a second end of said second gas flow path plane opposite to said first end thereof, wherein the second plurality of zigzag meandering grooves include a fourth flow path and a fifth flow path formed from the oxygen entry end towards the oxygen outlet end and a plurality of sixth flow paths arranged between the fourth flow path and the fifth flow path on said second gas flow path plane, wherein the fourth flow path is configured with a fifth longitudinal portion longitudinally arranged on the second gas flow path plane and a sixth crossing portion extending transversely to said fifth longitudinal portion and divided into a fifth minor path and a sixth minor path; wherein the fifth minor path and the sixth minor path extend transversely and outwardly relative to said fifth longitudinal portion to form a fifth plurality of bends, to converge into the fourth flow path and to communicate with the oxygen outlet end for an outflow of oxygen; wherein the plurality of sixth flow paths are configured with a sixth longitudinal portion extended longitudinally along said second gas flow path plane of said cathode electrode plate and with a seventh crossing portion extending transversely to said sixth longitudinal portion and divided into a seventh minor path and an eighth minor path; wherein the seventh minor path and the eighth minor path extend transversely and inwardly relative to said sixth longitudinal portion to form a sixth plurality of bends, to converge to the plurality of sixth flow paths and to communicate with the oxygen outlet end for the outflow of oxygen; the fifth flow path extending longitudinally along said second gas flow path plane to connect to the sixth plurality of bends, longitudinally arranged on the second gas flow path plane and communicated with the oxygen outlet end for the outflow of oxygen, and wherein the fifth through eighth minor paths are formed in an inverted V shape having a plurality of tips aligned in a second line along said second gas flow path plane;

a hydrogen flow path formed by the first plurality of zigzag meandering grooves on the first gas flow path plane of the anode electrode plate and an oxygen flow path formed by the second plurality of zigzag meandering grooves on the second gas flow path plane of the cathode electrode plate being operatively interconnected for guiding a flow of hydrogen and a flow of oxygen, respectively;

a plurality of vacancies formed by the first plurality of zigzag meandering grooves on the first gas flow path plane of the anode electrode plate affixed with the second plurality of zigzag meandering grooves on the second gas flow path plane of the cathode electrode plate, said vacancies being defined between said anode and cathode electrode plates by respective ones of said longitudinal and crossing portions of said first, second and third flow paths, respectively, on said anode electrode plate, and said fourth, fifth, and sixth flow paths, respectively, on said cathode electrode plate, traversing each other; and a coolant flow path formed by the plurality of vacancies for a flow of a coolant.

2. The bipolar plate structure having optimized gas flow channels as claimed in claim 1, wherein the anode electrode plate and the cathode electrode plate are provided with a coolant inlet at said first side of said anode electrode plate in cooperation with said first end of said cathode electrode plate, and a coolant outlet at an opposite side corresponding to the second side of said anode electrode plate in cooperation with said second end of said cathode electrode plate for communication with the plurality of said vacancies.

3. The bipolar plate structure having optimized gas flow channels as claimed in claim 2, wherein the coolant inlet and the coolant outlet are further respectively provided with a coolant entrance support and a coolant export support.

4. The bipolar plate structure having optimized gas flow channels as claimed in claim 2, wherein the anode electrode plate and the cathode electrode plate are made of a metal material.

5. The bipolar plate structure having optimized gas flow channels as claimed in claim 4, wherein the metal material is stainless steel.

6. The bipolar plate structure having optimized gas flow channels as claimed in claim 4, wherein each of the anode electrode plate and the cathode electrode plate has a thickness ranging from 0.1 mm to 0.2 mm.

7. The bipolar plate structure having optimized gas flow channels as claimed in claim 1, wherein the first flow path, the second flow path and the plurality of third flow paths have identical overall lengths.

8. The bipolar plate structure having optimized gas flow channels as claimed in claim 1, wherein the fourth flow path, the fifth flow path and the plurality of sixth flow paths have identical overall lengths.

9. The bipolar plate structure having optimized gas flow channels as claimed in claim 1, wherein the anode electrode plate and the cathode electrode plate are further provided with a first quick connector and a second quick connector respectively on one side thereof for measuring voltage and current.

10. A fuel cell, comprising:
a plurality of fuel cell units connected in series, each of the plurality of fuel cell units being configured with:
a membrane electrode assembly composed of at least two bipolar plate structures having optimized gas flow channels and reversely disposed one respective to another, and at least two sealing members,
wherein the membrane electrode assembly has two sides, wherein each of the two sides of the membrane electrode assembly is sequentially disposed with one of the at least two sealing members and one of the at least two bipolar plate structures having optimized gas flow channels,
wherein said at least two bipolar plate structures include:
an anode electrode plate comprising a first gas flow path plane, a first plurality of zigzag meandering grooves formed on the first gas flow path plane for a flow of hydrogen, a hydrogen entry end on a first side of said first gas flow path plane, and a hydrogen outlet end on a second side of said gas flow path plane opposite to said first side thereof, wherein the first plurality of zigzag meandering grooves include a first plurality of flow paths formed between the hydrogen entry end and the hydrogen outlet end, said first plurality of flow paths being configured with a first plurality of longitudinal portions extending longitudinally along said first gas flow path plane and a first plurality of crossing portions extending transversely to respective of said first plurality of longitudinal portions; and wherein said first plurality of crossing portions of said first plurality of said flow paths are formed in an inverted V shape having a first plurality of tips aligned in a first line along said first gas flow path plane; and
a cathode electrode plate reversely disposed relative to the anode electrode plate and comprising a second gas flow path plane, a second plurality of zigzag meandering grooves formed on the second gas flow path plane for a flow of oxygen, an oxygen entry end disposed at a first end of said second gas flow path plane, and an oxygen outlet end disposed at a second end of said second gas flow path plane opposite to said first end thereof, wherein the second plurality of zigzag meandering grooves includes a second plurality of flow paths formed between the oxygen entry end and the oxygen outlet end, said second plurality of the flow paths being configured with a second plurality of longitudinal portions longitudinally arranged on the second gas flow path plane and a second plurality of crossing portions extending transversely to respective of said second plurality of longitudinal portions and wherein the second plurality of the crossing portions of said second plurality of said flow paths are formed in an inverted V shape having a plurality of tips aligned in a second line along said second gas flow path plane;
a hydrogen flow path formed by the first plurality of zigzag meandering grooves on the first gas flow path plane of the anode electrode plate and an oxygen flow path formed by the second plurality of zigzag meandering grooves on the second gas flow path plane of the cathode electrode plate being operatively interconnected for guiding a flow of hydrogen and a flow of oxygen, respectively;
a plurality of vacancies formed between the first plurality of zigzag meandering grooves on the first gas flow path plane of the anode electrode plate and the second plurality of zigzag meandering grooves on the second gas flow path plane of the cathode electrode plate, said plurality of vacancies being defined between said anode and cathode electrode plates by respective ones of said longitudinal and crossing portions of said first and second pluralities of the flow paths, on said anode and cathode electrode plates, respectively, traversing each other; and
a coolant flow path formed by the plurality of vacancies for a flow of a coolant.

* * * * *